US008396647B2

(12) United States Patent
Tsunooka et al.

(10) Patent No.: US 8,396,647 B2
(45) Date of Patent: Mar. 12, 2013

(54) CONTROL APPARATUS AND METHOD OF CONTROLLING INTERNAL COMBUSTION ENGINE MOUNTED ON VEHICLE

(75) Inventors: Takashi Tsunooka, Gotenba (JP); Yoshiyuki Shogenji, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 335 days.

(21) Appl. No.: 12/674,447

(22) PCT Filed: Oct. 21, 2008

(86) PCT No.: PCT/IB2008/002802
§ 371 (c)(1),
(2), (4) Date: Feb. 22, 2010

(87) PCT Pub. No.: WO2009/053810
PCT Pub. Date: Apr. 30, 2009

(65) Prior Publication Data

US 2011/0120415 A1 May 26, 2011

(30) Foreign Application Priority Data

Oct. 23, 2007 (JP) ................................ 2007-275223

(51) Int. Cl.
*G06F 19/00* (2011.01)
*G06G 7/70* (2006.01)
*F02M 3/06* (2006.01)
*F02M 3/00* (2006.01)
*F02D 41/00* (2006.01)

(52) U.S. Cl. ................ 701/110; 123/339.1; 123/339.16

(58) Field of Classification Search ................. 123/350, 123/320, 325, 332, 333, 339.1, 339.15, 339.16, 123/322, 339.19, 396; 701/70, 71, 75, 80, 701/82, 84, 90, 91, 85, 110; 180/197
See application file for complete search history.

(56) References Cited

U.S. PATENT DOCUMENTS 6,002,979 A * 12/1999 Ishizu ............................ 701/86
2007/0015630 A1 1/2007 Miyazaki

FOREIGN PATENT DOCUMENTS

| | | | |
|---|---|---|---|
| DE | 198 03 653 | A1 | 8/1998 |
| EP | 1 450 039 | A1 | 8/2004 |
| JP | 08-074992 | A | 3/1996 |
| JP | 2003-239791 | A | 8/2003 |
| JP | 2006-046263 | A | 2/2006 |

* cited by examiner

*Primary Examiner* — Stephen K Cronin
*Assistant Examiner* — Sherman Manley
(74) *Attorney, Agent, or Firm* — Sughrue Mion, PLLC

(57) ABSTRACT

When an engine shifts to idle operation in a process of stopping an automobile, a target engine speed of an engine idle speed control is reduced and a threshold engine speed of an engine speed reduction prevention control is also reduced accordingly, provided that the automobile is traveling on a road surface with low friction coefficient.

11 Claims, 6 Drawing Sheets

VEHICLE SPEED

ENGINE ROTATIONAL SPEED

ROTATION REDUCTION PREVENTION CONTROL

ENGINE ROTATIONAL SPEED

ROTATION REDUCTION PREVENTION CONTROL

CONTROL APPARATUS AND METHOD OF CONTROLLING INTERNAL COMBUSTION ENGINE MOUNTED ON VEHICLE

BACKGROUND OF THE INVENTION

1. Field of the Invention

The invention relates to a control apparatus and a method of controlling an internal combustion engine mounted on a vehicle.

2. Description of the Related Art

During idle operation of an internal combustion engine mounted on a vehicle, such as an automobile, an engine Idle Speed Control (ISC) for adjusting the engine speed to a target engine speed set in accordance with the engine operation state, such as an engine temperature, is performed. The target engine speed of the engine idle speed control is set as follows based on, for example, the engine temperature. That is, the target engine speed of the engine idle speed control is set higher when the engine temperature is low, and hence the viscosity of lubricating oil is high, than when the engine temperature is high, and hence the viscosity of the lubricating oil is low. This is because, as the viscosity of the lubricating oil for the internal combustion engine increases, the rotational resistance of the engine increases and the likelihood that the engine will stall during idle operation, which results from the increased rotational resistance, needs to be suppressed. Further, when the internal combustion engine is idling, the engine speed reduction prevention control for rapidly increasing the engine speed to suppress the stalling of the engine when the engine speed is equal to or below a threshold engine speed, which is lower than the target engine speed, is executed as well (see Japanese patent application publication No. 2006-46263 (JP-A-2006-46263) (paragraphs [0030] and [0036])).

If the engine temperature is low and the target engine speed of the engine idle speed control is set high when the speed of the vehicle is equal to or lower than a predetermined vehicle speed to shift the engine operation to the idle operation in the process of stopping the vehicle from running through the action of a brake, the engine speed during idle operation is also set high accordingly. In this case, the driving force applied to driving wheels of the vehicle at that moment becomes large as a result of the engine speed during idle operation that is set high as described above. Even when a braking force is applied to the driving wheels through the brake, the rotational speed of the driving wheels is unlikely to be reduced. Thus, it takes some time to stop the vehicle from running.

To cope with such a situation, in the process of stopping the vehicle from running, the transmission may be held in a neutral state to prevent the driving force from being applied to the driving wheels of the vehicle, as described in Japanese patent application publication No. 8-74992 (paragraphs [0032] to [0034]). In this case, even if the engine speed is adjusted to the target engine speed, which has been set high, upon a shift of engine operation to idle operation that results from the vehicle speed that has become equal to or lower than the predetermined value, the driving force based on engine speed at that moment is not transmitted to the driving wheels. It is therefore assumed that the vehicle can be swiftly stopped from running after the shift to idle operation. However, in the process of stopping the vehicle from running before the shift to idle operation, the transmission is held in the neutral state and hence a driving force transmission path between each of the driving wheels and the internal combustion engine is shut off. Thus, the rotational resistance of the internal combustion engine does not act as a braking force for the driving wheels, and the braking force for stopping the vehicle from running is provided entirely by the brake alone. However, it is possible that the brake alone will not be able to provide the required braking force. If the braking force cannot be ensured with ease, it takes longer time to stop the vehicle from running.

Further, instead of holding the transmission in neutral in the process of stopping the vehicle from running, it is also conceivable to forcibly reduce the target engine speed of the engine idle speed control upon a shift of engine operation to idle operation, and thereby reduce the engine speed during the engine idle operation so that the driving force applied to the driving wheels on the basis of engine speed is held small. In this case, in the process of stopping the vehicle from running before the shift to idle operation, the rotational resistance of the internal combustion engine acts as a braking force for the driving wheels. Thus, the braking force for swiftly stopping the vehicle from running may be applied to the driving wheels through the rotational resistance of the internal combustion engine and the brake. Further, after the shift of engine operation to idle operation in the process of stopping the vehicle from running, the driving force applied to the driving wheels may be held small by forcibly reducing the target engine speed used in the engine idle speed control. Thus, the vehicle is swiftly stopped from running.

As described above, the vehicle is swiftly stopped from running by forcibly reducing the target engine speed of the engine idle speed control upon a shift of engine operation to idle operation in the process of stopping the vehicle from running.

However, when the target engine speed is forcibly reduced, it becomes close to the threshold engine speed of the engine speed reduction prevention control. Thus, in adjusting the engine speed to the reduced target engine speed through engine idle speed control, there may be a disturbance acting on the driving wheels in such a direction as to stop rotation thereof. For example, an external force (a frictional force or the like) applied from a road surface side to the driving wheels may act reversely to the rotational direction of the driving wheels. When the disturbance acts on the driving wheels, the engine speed may be reduced below the threshold engine speed. Then, when the engine speed becomes lower than the threshold engine speed, a rapid rise in the engine speed is caused through engine speed reduction prevention control for suppressing the stalling of the internal combustion engine. Thus, the driving force applied to the driving wheels based on the engine speed becomes larger than the braking force. As a result, it becomes difficult to swiftly stop the vehicle from running.

SUMMARY OF THE INVENTION

The invention provides a control apparatus and a control method for an internal combustion engine mounted on a vehicle that restrains an engine speed rotation reduction prevention control from being executed in response to a reduction in a target engine speed when stopping the vehicle from running, and that prevents swift stoppage of the vehicle from becoming difficult as a result of a rapid increase in the engine speed through the execution of the engine speed reduction prevention control.

In a control apparatus for an internal combustion engine according to a first aspect of the invention, an engine idle speed control for adjusting the engine speed to a target engine speed set in accordance with an engine operation state and an engine speed reduction prevention control for rapidly increasing the engine speed to suppress stalling of the internal combustion engine when the engine speed is equal to or lower than a threshold engine speed, which is lower than the target engine speed, are executed during idle operation of the internal combustion engine, and the target engine speed of the engine idle speed control is reduced when the speed of the vehicle is equal to or lower than a predetermined vehicle speed to shift the internal combustion engine to idle operation when stopping the vehicle from running. The control apparatus includes detection means for detecting whether the vehicle is traveling on a road surface with low friction coefficient, and engine speed reduction means for reducing the target engine speed at a time of a shift of the internal combustion engine to idle operation in the process of stopping the vehicle from running and reducing the threshold engine speed of the engine speed reduction prevention control only if the vehicle is traveling on a road surface with low friction coefficient.

If the speed of the vehicle is equal to or lower than the predetermined vehicle speed for shifting the internal combustion engine mounted on the vehicle to idle operation in the process of stopping the vehicle from running, when the target engine speed of the engine idle speed control is reduced, the engine speed is thereby reduced. In this state, if there is a disturbance acting on driving wheels of the vehicle in such a direction as to stop rotation thereof, for example, when an external force is applied from the road surface side to the driving wheels reversely to a rotational direction thereof, the engine speed is thereby reduced and approaches the threshold engine speed of the engine speed reduction prevention control.

According to the foregoing configuration, if a shift of engine operation to idle operation is made in the process of stopping the vehicle from running, the target engine speed of the engine idle speed control is reduced and the threshold engine speed of the engine speed reduction prevention control is also reduced accordingly, only if the vehicle is traveling on a road surface with low friction coefficient. Thus, the engine speed is restrained from being reduced through the action of the disturbance acting on the driving wheels and becoming equal to or lower than the threshold engine speed. This is because of the following reasons [1] and [2].

[1] On a road surface with low friction coefficient, there is less disturbance acting on the driving wheels in such a direction as to stop rotation thereof. For example, on a road surface with low friction coefficient, a relatively small external force (a relatively small frictional force or the like) is applied from the road surface side to the driving wheels reversely to the rotational direction thereof. Thus, the engine rotational speed is reduced by a relatively small value through the disturbance.

[2] Even if the engine rotational speed is reduced through the action of the disturbance on the driving wheels in such a direction as to stop rotation thereof, the threshold rotational speed has been reduced. Therefore, the engine speed is unlikely to be reduced below the threshold engine speed. Even if the threshold engine speed is reduced as described above, this reduction is carried out only on a road surface with low friction coefficient where the engine speed is reduced by a relatively small value through the action of the disturbance on the driving wheels as described in the section [1]. Therefore, the reduction in the engine rotational speed does not cause the internal combustion engine to stall.

As described above, the target engine speed is reduced in the process of stopping the vehicle from running, and the threshold engine speed is reduced accordingly, if the vehicle is traveling on a road with low friction coefficient. The engine speed reduction prevention control is thereby restrained from being executed as the target engine speed is reduced. Accordingly, a rapid increase in the engine speed through execution of the engine speed reduction prevention control, which would make it difficult to stop the automobile, may be prevented. Further, the internal combustion engine is prevented from undergoing a stall as a result of the restraint of the performance of the rotation reduction prevention control.

In the first aspect of the invention, the target rotational speed may be gradually reduced when the speed of the vehicle becomes equal to or lower than the predetermined value to make a shift of the internal combustion engine mounted on the vehicle to idle operation in the process of stopping the vehicle from running, and the reduction means may gradually reduce the threshold rotational speed in a manner corresponding to reduction of the target rotational speed.

When a shift of engine operation to idle operation is made in the process of stopping the vehicle from running, the target rotational speed for idle rotational speed control is gradually reduced with a view to, for example, restraining the durability of components from deteriorating as a result of a rapid reduction in the engine rotational speed and restraining the engine rotational speed from undershooting with respect to the target rotational speed. If reduction of the threshold rotational speed for rotation reduction prevention control is rapidly carried out in starting this gradual reduction of the target rotational speed, the threshold rotational speed is then made much lower than the target rotational speed. When the engine rotational speed is rapidly reduced under such a situation, there may be caused an inconvenience as to a rapid rise in the engine rotational speed through rotation reduction prevention control. That is, when the engine rotational speed becomes equal to or lower than the threshold rotational speed, which has been made much lower than the target rotational speed, due to a rapid reduction in the engine rotational speed, a rapid rise in the engine rotational speed cannot be realized despite an attempt to rapidly raise the engine rotational speed through the performance of rotation reduction prevention control. As a result, a stall of the internal combustion engine may be caused.

According to the foregoing configuration, when the target rotational speed is gradually reduced in accordance with a shift to idle operation in the process of stopping the vehicle from running, the threshold rotational speed is also gradually reduced correspondingly. Therefore, the occurrence of the inconvenience can be suppressed. That is, when the engine rotational speed is rapidly reduced under a situation where the target rotational speed is being gradually reduced, reduction of the engine rotational speed to a value equal to or lower than the threshold rotational speed, which is gradually reduced as the target rotational speed is reduced, occurs at an early timing. Thus, rotation reduction prevention control is swiftly performed to rapidly raise the engine rotational speed. The engine rotational speed is thus rapidly raised through rotation reduction prevention control at an early timing when the engine rotational speed is rapidly reduced. Therefore, the occurrence of the inconvenience, namely, the occurrence of a possible stall of the internal combustion engine resulting from the inability to realize a rapid rise in the engine rotational speed is suppressed.

In the first aspect of the invention, the target rotational speed may be restored to a pre-reduction value thereof after having been reduced during idle operation in the process of stopping the vehicle from running, on a condition that the vehicle have been stopped from running, and the reduction means may restore the reduced threshold rotational speed to a pre-reduction value thereof on the basis of restoration of the target rotational speed to the pre-reduction value thereof.

If the target rotational speed for idle rotational speed control and the threshold rotational speed for rotation reduction prevention control are not restored to the pre-reduction values thereof respectively after the vehicle has been stopped from running, there may arise a situation where the engine rotational speed is reduced by the rotational resistance of the internal combustion engine or the like, and a situation where the engine rotational speed thereby becomes equal to or lower than the threshold rotational speed and cannot be rapidly raised despite the performance of rotation reduction prevention control.

According to the foregoing configuration, the target rotational speed is restored to the pre-reduction value thereof on the condition that the vehicle have been stopped from running, and the threshold rotational speed is also restored to the pre-reduction value thereof on the basis of the restoration of the target rotational speed. Therefore, the occurrence of the inconvenience can be suppressed. That is, the engine rotational speed can be restrained from being reduced through the rotational resistance of the internal combustion engine or the like due to the restoration of the target rotational speed to the pre-reduction value thereof. Further, when the engine rotational speed becomes equal to or lower than the threshold rotational speed due to the restoration of the threshold rotational speed to the pre-reduction value thereof and rotation reduction prevention control is performed, the performance of this control occurs in a state where the engine rotational speed is high. Accordingly, the occurrence of a situation where the engine rotational speed cannot be rapidly raised despite the performance of the control can be suppressed.

Furthermore, the target rotational speed may be gradually restored to the pre-reduction value thereof, and the reduction means may gradually restore the threshold rotational speed to the pre-reduction value thereof in a manner corresponding to restoration of the target rotational speed to the pre-reduction value thereof.

After the vehicle has been stopped from running, the target rotational speed for idle rotational speed control is gradually restored to the pre-reduction value thereof, with a view to, for example, restraining the engine rotational speed from overshooting with respect to the target rotational speed. If restoration of the threshold rotational speed for rotation reduction prevention control to the pre-reduction value thereof is rapidly carried out upon the completion of restoration of the target rotational speed, which is gradually restored as described above, the threshold rotational speed is made much lower than the target rotational speed until restoration of the threshold rotational speed is started after the start of restoration of the target rotational speed. Under this situation, when the drive load of an auxiliary in the internal combustion engine increases in response to an increase in a drive request value for the auxiliary, which is driven by the internal combustion engine, and the engine rotational speed is thereby rapidly reduced, there may be caused an inconvenience as to a rapid rise in the engine rotational speed through rotation reduction prevention control. That is, when the engine rotational speed becomes equal to or lower than the threshold rotational speed, which has been made much lower than the target rotational speed, due to a rapid reduction in the engine rotational speed, a rapid rise in the engine rotational speed cannot be realized owing to an excessively rapid reduction in the engine rotational speed, despite an attempt to rapidly raise the engine rotational speed through the performance of rotation reduction prevention control. As a result, a stall of the internal combustion engine may be caused.

According to the foregoing configuration, when the target rotational speed is gradually restored to the pre-reduction value thereof in response to the completion of stoppage of the running of the vehicle, the threshold rotational speed is also gradually restored to the pre-reduction value thereof in a manner corresponding to the start of restoration of the target rotational speed. Therefore, the occurrence of the inconvenience can be suppressed. That is, when the drive request value for the auxiliary driven by the internal combustion engine increases, the drive load of the auxiliary in the engine increases, and the engine rotational speed is thereby rapidly reduced under a situation where the target rotational speed is being gradually restored to the pre-reduction value thereof, the engine rotational speed is reduced at an early timing to a value equal to or lower than the threshold engine speed, which is gradually restored toward the pre-reduction value thereof as the target engine speed is restored. Thus, the engine speed reduction prevention control is swiftly executed to rapidly increase the engine speed. The engine speed is thus rapidly increased through execution of the engine speed reduction prevention control at an early timing when the engine speed is rapidly reduced. Therefore, the inability to rapidly increase the engine speed is less likely to cause the engine to stall.

Furthermore, the engine speed reduction means may set a value obtained by subtracting a certain set value from the target rotational speed as the threshold engine speed.

According to the above described configuration, the value obtained by subtracting the certain set value from the target engine speed is set as the threshold engine speed. Thus, if the target engine speed is gradually reduced upon a shift of engine operation to idle operation in the process of stopping the vehicle from running, the threshold engine speed is also appropriately and gradually reduced in accordance with gradual reduction of the target speed. Further, when the target engine speed is gradually restored to the pre-reduction value thereof after the vehicle has been stopped from running, the threshold engine speed is also appropriately and gradually restored to the pre-reduction value thereof in accordance with gradual restoration of the target engine speed.

In the first aspect of the invention, the engine speed reduction means may compare the reduced threshold engine speed with a lower-limit engine speed, which is a value corresponding to the minimum engine speed at which the internal combustion engine may autonomously operate, and use the lower-limit rotational speed as the threshold rotational speed when the threshold rotational speed is lower than the lower-limit rotational speed. In addition, the engine speed reduction means may variably set the lower-limit engine speed based on an engine temperature.

According to the foregoing configuration, even if the threshold engine speed of the engine speed reduction prevention control is reduced as the target engine speed of the engine idle speed control is reduced when the engine operation shifts to idle operation in the process of stopping the vehicle from running, reduction of the threshold engine speed occurs only to the lower-limit engine speed as the minimum rotational speed at which the internal combustion engine can be autonomously operated. Thus, when the engine speed is reduced to a value equal to or lower than the threshold engine speed in accordance with reduction of the target engine speed and engine speed reduction prevention control is executed, the occurrence of an inconvenience, namely, the stalling of the internal combustion engine resulting from the inability to realize a rapid increase the engine speed through the control, may be appropriately suppressed.

In a control method for an internal combustion engine mounted on a vehicle according to a second aspect of the invention, and engine idle speed control for adjusting an engine speed to a target engine speed set in accordance with an engine operation state and an engine speed reduction prevention control for rapidly increasing the engine speed to restrain the internal combustion engine from stalling when the engine speed is equal to or lower than a threshold engine speed, which is lower than the target engine speed, are executed during idle operation of the internal combustion engine and the target engine speed for the engine idle speed control is reduced when the speed of the vehicle is equal to or lower than a predetermined value to shift the internal combustion engine to idle operation when stopping the vehicle from running. The control method includes detecting whether the vehicle is traveling on a road with low friction coefficient, and reducing the target engine speed upon the shift of the internal combustion engine to idle operation in the process of stopping the vehicle from running and reducing the threshold engine speed of the engine speed reduction prevention control when the vehicle is traveling on a road surface with low friction coefficient.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIGS. 2A to 2E are time charts respectively showing changes in vehicle speed, engine speed, and the mode of execution of an engine speed reduction prevention control when stopping an automobile from running;

FIGS. 5A to 5E are time charts respectively showing changes in vehicle speed, changes in engine rotational speed, and a mode of performance of rotation reduction prevention control in the process of stopping the automobile from running in the second embodiment of the invention.

DETAILED DESCRIPTION OF EMBODIMENTS

Figure 2A:
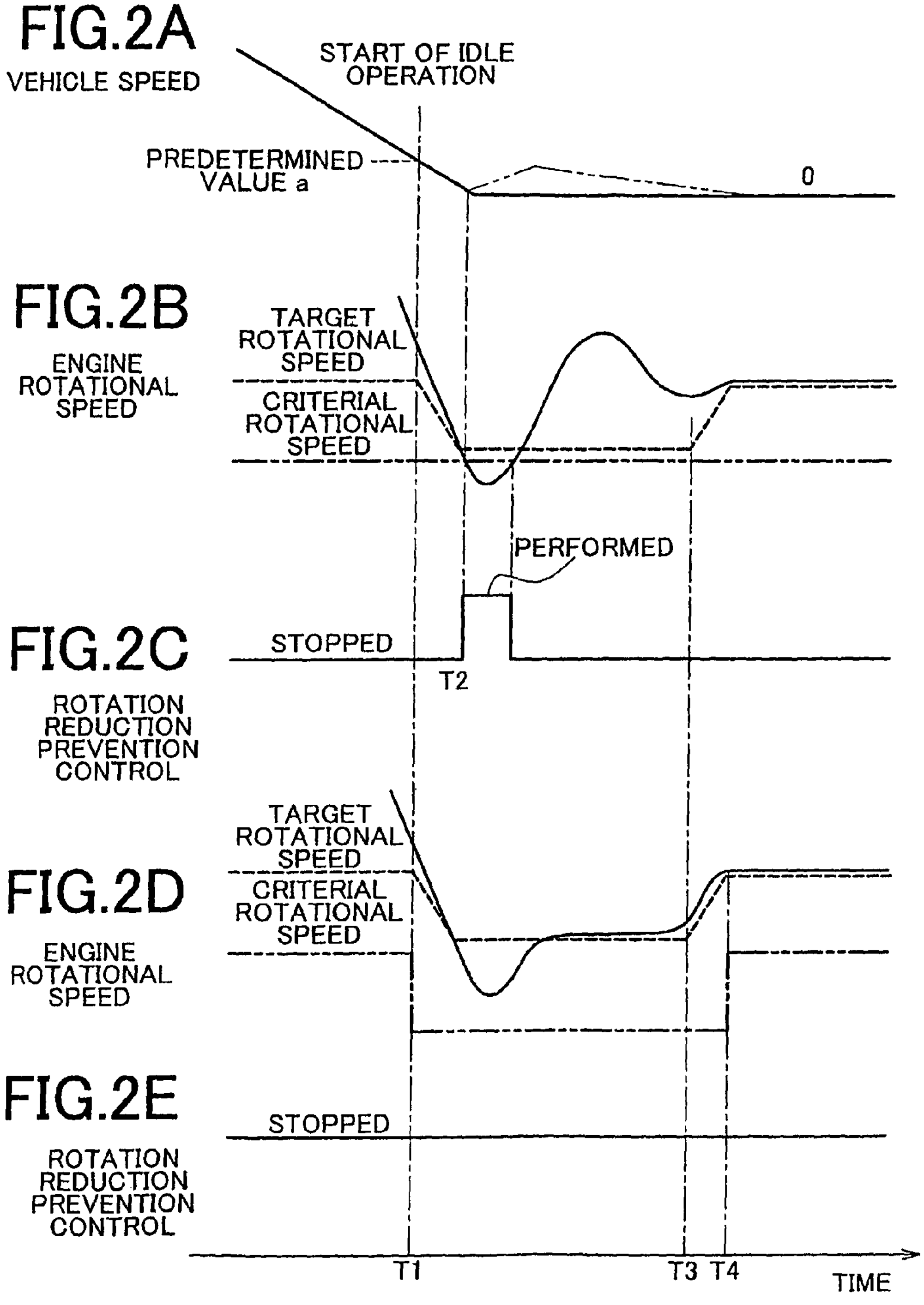
Figure 3:
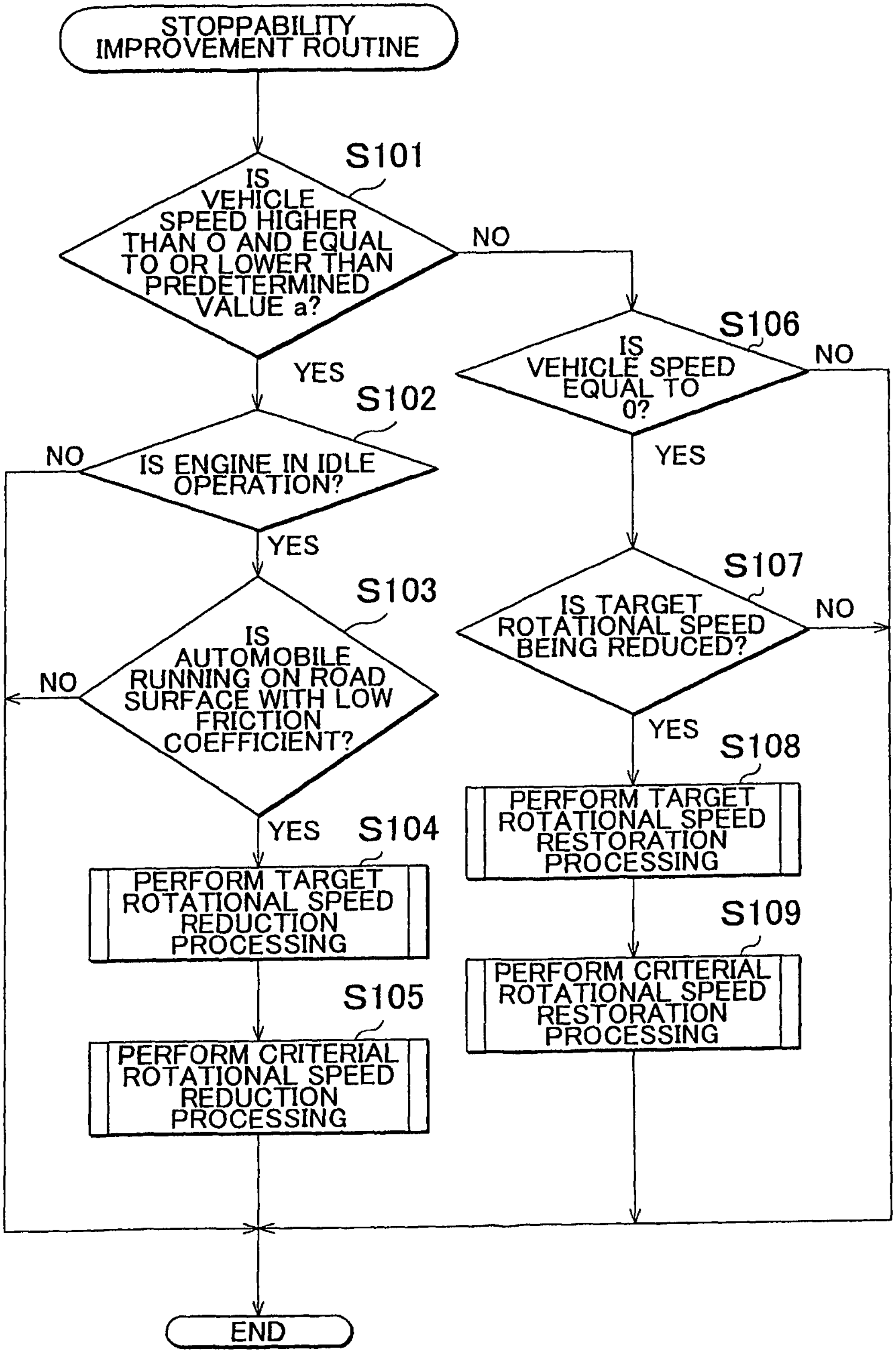
FIG. 3 is a flowchart showing a procedure of performing a processing for improving the stoppability of the automobile to swiftly stop the automobile from running.

The first embodiment, in which the invention is applied to an engine mounted on a rear-wheel-drive automobile, will be described hereinafter with reference to FIGS. 1 to 3.

Figure 1:
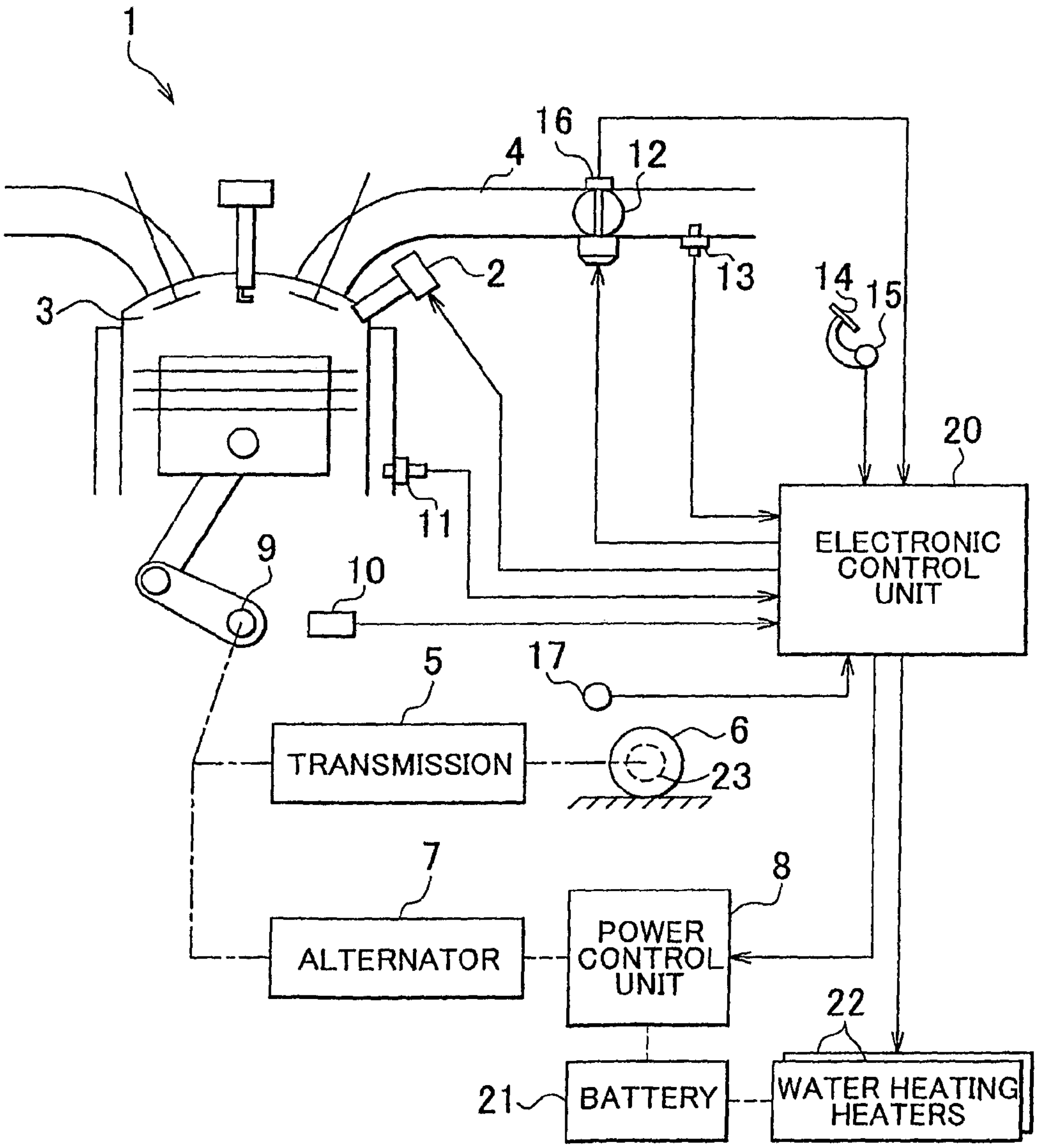
FIG. 1 is a schematic diagram showing an engine equipped with a control apparatus according to the first embodiment of the invention.

In an engine 1 shown in FIG. 1, air is drawn from an intake passage 4 into a combustion chamber 3, and an amount of fuel appropriate for the intake air amount is injected from a fuel injection valve 2 and supplied to the combustion chamber 3. Thus, as the amount of intake air is increased through the adjustment of the opening degree of a throttle valve 12 provided in the intake passage 4, the amount of a mixture burned in the combustion chamber 3 increases and the output of the engine increases. The crankshaft 9 of the engine 1 is connected to driving wheels (rear wheels) 6 of the automobile via a drive train including a transmission 5 such as an automatic transmission or the like. A brake 23 applies a braking force to the driving wheels 6 to stop the rotation of the driving wheels 6. Further, various auxiliaries such as an alternator 7, a compressor for an air-conditioner, and the like are also connected to the crankshaft 9.

The alternator 7 is one of the various auxiliaries driven by the engine 1 and is electrically connected to a battery 21 via a power control unit 8, and the operation of the alternator 7 is controlled by the power control unit 8. The alternator 7 generates power when the crankshaft 9 rotates. The generated alternating-current power is converted into a direct-current power through the power control unit 8 and stored in the battery 21. At this moment, the amount of power generation (the drive rate of the alternator 7) is adjusted by adjusting the voltage applied to an exciting coil of a rotor of the alternator 7 through the power control unit 8.

Various electric components mounted on the automobile are supplied with power through power generation by the alternator 7. That is, the various electric components of the automobile are supplied with a power from the alternator 7 and the battery 21 through the power control unit 8, and are driven on the basis of the power thus supplied. The various electric components of the automobile may include a plurality of (two in this first embodiment of the invention) water heating heaters 22 that are energized/heated to heat coolant for the engine 1 when the coolant is in a much cooled state, an electric motor for a power steering device, a heating element for windows, and the like.

The automobile is equipped with an electronic control unit 20 that executes various controls regarding the engine 1, the transmission 5, and the like. The electronic control unit 20 is configured with a CPU for executing various processes regarding the various controls, a ROM in which programs and data required for the various controls are stored, a RAM in which calculation results of the CPU and the like are temporarily stored, input/output ports for inputting/outputting signals to/from the outside, and the like.

Various sensors, which will be described below, are connected to an input port of the electronic control unit 20. The sensors may include an accelerator position sensor 15 for detecting a depression amount of an accelerator pedal 14 (accelerator depression amount) that is operated by a driver of the automobile, a throttle position sensor 16 for detecting an opening degree of the throttle valve 12 (throttle opening degree), an airflow meter 13 for detecting a flow rate of air drawn into the combustion chamber 3 via the intake passage 4 (intake air flow rate), a crank position sensor 10 that outputs a signal indicating the rotation of the crankshaft 9 as the output shaft of the engine 1, a coolant temperature sensor 11 for detecting a temperature of coolant for the engine 1, and a vehicle speed sensor 17 that detects the vehicle speed. Further, drive circuits for the fuel injection valve 2, the throttle valve 12, and the like are connected to an output port of the electronic control unit 20.

The electronic control unit 20 outputs a command signal to each of the drive circuits for the respective components that are connected to the output port, in accordance with an engine operation state grasped through detection signals input from the respective sensors. The electronic control unit 20 thus executes various controls such as the control of the amount of fuel injected from the fuel injection valve 2, the control of the opening degree of the throttle valve 12, the control of energization of the water heating heaters 22, the control of the driving of the alternator 7 (the power control unit 8), and the like.

Next, the control of the opening degree of the throttle valve 12 by the electronic control unit 20 will be described in detail. The opening degree of the throttle valve 12 is controlled based on a throttle opening degree command value TAt through the electronic control unit 20. The throttle opening degree command value TAt is calculated using expression (1) shown below.

$$TAt=TA\text{base}+Qcal\cdot kt \qquad (1)$$

TAbase: base throttle opening degree

Qcal: ISC correction amount kt: conversion coefficient

In expression (1), the base throttle opening degree TAbase calculated based on the accelerator depression amount calculated on the basis of a detection signal from the accelerator position sensor 15, an engine rotational speed calculated on the basis of a detection signal from the crank position sensor 10, and the like. The base throttle opening degree TAbase is set to "0" when the engine 1 is idling. The term "Qcal·kt" in the expression (1) is provided to execute engine idle speed control, namely, the control of the engine speed during idle operation.

The throttle opening degree command value TAt during idle operation is determined by the term "Qcal·kt" because the base throttle opening degree TAbase is "0". In this term "Qcal·kt", the ISC correction amount Qcal is a dimensionless parameter that is increased/reduced to adjust the engine speed during the engine idle speed control, and the conversion coefficient kt serves to convert the ISC correction amount Qcal into the throttle opening degree. In the engine idle speed control, the ISC correction amount Qcal is increased/reduced based on the deviation of the engine speed from the set target engine speed to ensure that the engine speed approaches the target engine speed.

That is, if the engine speed is below the target engine speed, the ISC correction amount Qcal is increased to increase the opening degree of the throttle valve 12. If the opening degree of the throttle valve 12 is thus increased to increase the amount of intake air in the engine 1, the fuel injection amount is increased accordingly, and the engine speed approaches the increased target engine speed. Further, if the engine speed is higher than the target engine speed, the ISC correaction amount Qcal is reduced to reduce the opening degree of the throttle valve 12. When the opening degree of the throttle valve 12 is thus reduced to reduce the amount of intake air in the engine 1, the fuel injection amount of is reduced accordingly, and the engine speed approaches the decreased target engine speed.

The engine speed while idling is adjusted to the target engine speed by executing the engine idle speed control as described above. Further, the target engine speed for the engine idle speed control is a value variably set in accordance with the temperature of the coolant for the engine 1, the magnitudes of drive request values for various auxiliaries driven by the engine 1, and the like. For example, the target engine speed is increased with increases in the drive request value for each of the auxiliaries, and conversely, is reduced with decreases in the drive request value. This is because of the purpose of restraining the engine from stalling while idling as a result of rotational resistance acting on the engine 1 during the driving of each of the auxiliaries, which increases as the drive request value for each of the auxiliaries increases. Further, the target engine speed is increased as the temperature of the coolant for the engine 1 (corresponding to an engine temperature) decreases. On the contrary, the target engine speed is reduced as the temperature of the coolant increases. This is because of the purpose of restraining the engine 1 from stalling during idle operation as a result of an increase in rotational resistance produced by lubricating oil for the engine 1, whose viscosity is increased as the temperature of the coolant decreases and as the temperature of the lubricating oil for the engine 1 decreases.

Further, during idle operation of the engine 1, the engine speed reduction prevention control is executed with a view to avoiding a situation where the engine speed cannot maintained at the target engine speed despite the execution of the engine idle speed control and is reduced to cause the engine 1 to stall. In the engine speed reduction prevention control, it is determined whether the engine speed is equal to or lower than a threshold engine speed as a value lower than the target engine speed for the engine idle speed control, and the engine speed is rapidly increased when the engine speed is equal to or below the threshold engine speed. More specifically, if the engine speed is equal to or below the threshold engine speed, a value obtained by adding a prescribed increase amount b to the throttle opening degree command value TAt is set as a new throttle opening degree command value TAt as indicated by an expression (2) shown below. The throttle opening degree command value TAt is thereby rapidly increased.

$$TAt\leftarrow TAt+b \qquad (2)$$

When the throttle opening degree command value TAt is thus rapidly increased, the opening degree of the throttle valve 12 is also rapidly increased. When the opening degree of the throttle valve 12 is thus increased to increase the amount of intake air drawn into the engine 1, the fuel injection amount is increased accordingly. As a result, the engine speed is rapidly increased to avoid stalling the engine 1. After the engine speed has been rapidly increased through the engine speed reduction prevention control, for example, after the engine speed is equal to or above the threshold engine speed, the throttle opening degree command value TAt is calculated based on the expression (1) and the opening degree of the throttle valve 12 is set to a normal value. The engine speed reduction prevention control is thereby terminated.

Next, engine idle speed control and engine speed reduction prevention control executed in the process of stopping the automobile from running will be described with reference to time charts of FIGS. 2A to 2E. In the process of stopping the automobile from running through the action of the brake 23 or the like, if the vehicle speed is equal to or below a predetermined value a, which is close to "0", to make a shift of the engine 1 to idle operation (at a timing T1) as shown in FIG. 2A, the engine idle speed control is executed. If the engine idle speed control is executed, the target engine speed of the engine idle speed control is set higher, for example, when the temperature of the coolant for the engine 1 (corresponding to the engine temperature) is low and the viscosity of the lubricating oil for the engine 1 is high than when the temperature of the coolant is high and hence the viscosity of the lubricating oil is low.

If the engine speed during idle operation is set high as a result of a low temperature of the coolant for the engine 1 as described above during a shift to the idle operation, the driving force applied to the driving wheels 6 of the automobile at that moment is increased. As a result, even if a braking force is applied to the driving wheels 6 by the brake 23, the rotational speed of the driving wheels 6 is unlikely to be reduced, and it takes a longer time to stop the automobile from running. Especially, if the engine speed is so high during a shift to idle operation that the driving force applied to the driving wheels 6 exceeds a maximum value of the braking force applied to the driving wheels 6 by the brake 23, the inconvenience is more remarkable. That is, it takes more time to stop the automobile from running.

To cope with this problem, when the target engine speed of the engine idle speed control is high during a shift to the idle operation, the target engine speed is forcibly reduced. It is determined whether the target engine speed is high, based on whether the target engine speed is equal to or higher than a prescribed threshold engine speed. It is conceivable to set the threshold engine speed to such a value that the driving force applied to the driving wheels 6 based on engine speed is equal to or exceeds a maximum value of the braking force applied to the driving wheels 6 by the brake 23 when the engine speed is adjusted to the threshold engine speed. Then, if the target engine speed is equal to or higher than the threshold engine speed, it is determined that the target engine speed is high, and thus it is necessary to forcibly reduce the target engine speed.

Further, it is conceivable to forcibly reduce the target engine speed, for example, as follows. That is, a reduction amount of the target engine speed needed to make the target engine speed equal to or lower than the threshold engine speed is calculated based on the target engine speed and the threshold engine speed, and the target engine speed is reduced by the reduction amount. The reduction of the target engine speed by the reduction amount is gradually carried out with a view to, for example, minimizing the deterioration of the components of the engine 1 as a result of a rapid reduction in the engine speed and restraining the engine speed from undershooting the target engine speed. Owing to the foregoing procedure, when the target engine speed is forcibly reduced by the reduction amount during a shift of the engine 1 to the idle operation (T1), reduction of the target engine speed is carried out as indicated by, for example, broken lines in FIG. 2B.

As described above, when the engine 1 shifts to idle operation when stopping the automobile from running (T1), the automobile is swiftly stopped from running by forcibly reducing the target engine speed for idle rotational speed control. However, if forcible reduction of the target engine speed is carried out, the target engine speed (indicated by the broken lines in FIG. 2B) approaches the threshold engine speed for the engine speed reduction prevention control (indicated by alternate long and two short dashes lines in FIG. 2B). Therefore, if there is a disturbance acting on the driving wheels 6 in such a direction as to stop rotation thereof, for example, when an external force (a frictional force or the like) from a road surface side is applied to the driving wheels 6 reversely to the rotational direction thereof in adjusting the engine speed to the reduced target engine speed through engine idle speed control, the engine speed may thereby be reduced below the threshold engine speed. Then, if the engine speed is reduced below the threshold engine speed (at a timing T2), the engine speed reduction prevention control is executed as shown in FIG. 2C. The engine speed is rapidly increased through the engine speed reduction prevention control as indicated by a solid line in FIG. 2B. Thus, the driving force applied to the driving wheels 6 based on the engine speed exceeding the braking force applied to the driving wheels 6 by the brake 23. As a result, reduction of the vehicle speed to “0” is delayed as indicated by alternate long and two short dashes lines in FIG. 2A, and it becomes difficult to swiftly stop the automobile from running.

Thus, in the first embodiment of the invention, when the engine 1 shifts to idle operation in the process of stopping the automobile from running (T1), the target engine speed for the engine idle speed control is reduced and the threshold engine speed for the engine speed reduction prevention control is reduced, only on the condition that the automobile be traveling on a road surface with low friction coefficient. More specifically, if the automobile is traveling on a road surface with low friction coefficient and the target engine speed is equal to or higher than the threshold engine speed at time T1 in FIG. 2, reduction of the target engine speed by the reduction amount is carried out as indicated by broken lines in FIG. 2D, and the threshold engine speed is also reduced accordingly as indicated by alternate long and two short dashes lines in FIG. 2D.

Thus, when reduction of the engine speed occurs as the target engine speed is reduced (as indicated by the broken lines), the engine speed is restrained from being reduced through the action of the disturbance on the driving wheels 6 and becoming equal to or below the threshold engine speed (as indicated by the alternate long and two short dashes lines). This is based on two reasons described below in [1] and [2].

[1] On a road surface with low friction coefficient, there is less resistance acting on the driving wheels 6 in such a direction as to stop rotation thereof. For example, a relatively small resistance from the road surface side is applied to the driving wheels 6 against the rotational direction thereof. Thus, the engine speed is reduced by a relatively small amount by the disturbance.

[2] Even if the engine rotational speed is reduced due to the disturbance acting on the driving wheels 6 in such a direction as to stop rotation thereof, the threshold engine speed has been reduced as indicated by the alternate long and two short dashes lines in FIG. 2D. Thus, the engine speed (the solid line) is unlikely to be reduced below the threshold engine speed. Even when the threshold engine speed (as indicated by the alternate long and two short dashes lines) is reduced as described above, this reduction is carried out only on a road surface with low friction coefficient where the engine speed is reduced by a relatively small amount through the action of the disturbance on the driving wheels 6 as described above in [1]. Therefore, reduction of the engine speed does not cause the engine 1 to stall.

As described above, the target engine speed is reduced in the process of stopping the automobile from running and the threshold engine speed is reduced accordingly, provided that the automobile be traveling on a road surface with low friction coefficient. Execution of the engine speed reduction prevention control is suspended as the target engine speed is reduced, as shown in FIG. 2E. Accordingly, the automobile may be swiftly stopped without interference from a rapid increase in the engine speed (as indicated by the solid line in FIG. 2B) due to the execution of the engine speed reduction prevention control. In this case, the engine speed does not drop to the extent where the engine 1 may stall but changes as indicated by, for example, a solid line in FIG. 2D to be adjusted to the target engine speed (as indicated by the broken lines).

Next, the execution of the process for swiftly stopping the automobile from running will be described in detail with reference to a flowchart of FIG. 3, which shows a stoppability improvement routine. In this routine, a transition to step S103 is made if the vehicle speed is higher than 0 and equal to or below a predetermined value a and that the engine 1 be in idle operation with the accelerator depression amount equal to “0” (YES in both S101 and S102), in other words, on the condition that the engine 1 have been shifted to idle operation in the process of stopping the automobile from running.

In step S103, it is determined based on the road surface information stored in the RAM of the electronic control unit 20 whether the automobile is traveling on a road surface with low friction coefficient. The road surface information is stored into the RAM according to, for example, the method described below. That is, a reference acceleration as a theoretical acceleration on a standard road surface to run on is calculated from a throttle opening degree, a vehicle speed, a change gear ratio, and the like during acceleration of the automobile. If the actual acceleration is below the reference acceleration by a value equal to or larger than a prescribed threshold value, it is determined that the automobile is currently traveling on a road surface with low friction coefficient, and this information is stored into the RAM. Alternatively, it is possible to adopt a method including the steps of calculating a difference between the rotational speed of the driving wheels 6 and the rotational speed of the driven wheels during acceleration of the automobile, determining that the automobile is currently traveling on a road surface with low friction coefficient if the difference is equal to or larger than a prescribed threshold value, and storing the information into the RAM.

If it is determined in step S103 that the automobile is traveling on a road surface with low friction coefficient, a target engine speed reduction process (S104) for forcibly reducing the target engine speed of the engine idle rotational control is executed. Then, as this target engine speed reduction process, if the target engine speed is equal to or higher than the threshold value, gradual reduction of the target engine speed is carried out by a reduction amount determined based on the threshold value and the target engine speed.

Then, the threshold engine speed reduction process (S105) for reducing the threshold engine speed for the engine speed reduction prevention control based on reduction of the target engine speed is executed. By reducing the threshold engine speed through the threshold engine speed reduction process, the engine speed is restrained from becoming equal to or lower than the threshold engine speed even when further reduction of the engine speed is caused due to the action of the disturbance on the driving wheels 6 in the course of reduction of the engine speed resulting from reduction of the target engine speed. Accordingly, the engine speed is restrained from being rapidly increased through the execution of the engine speed reduction prevention control as a result of reduction of the engine speed, and the vehicle speed is not prevented from being reduced either through a rapid increase of the engine speed. Therefore, the automobile can be swiftly stopped from running.

On the other hand, if a negative determination is made in step S101, it is determined whether the automobile has been stopped from running with the vehicle speed equal to "0" (S106). If a positive determination is made in this step, a target engine speed restoration process (S108) for restoring the target engine speed of the engine idle speed control to the pre-reduction value thereof is performed if the target engine speed if being reduced (S 107: YES). Then, the target engine speed is gradually restored to the pre-reduction value thereof as the target engine speed restoration process. In the example of FIG. 2D, when time T3 is reached, the target engine speed is gradually restored to the pre-reduction value thereof as indicated by broken lines. The target engine speed is gradually restored to the pre-reduction value thereof to, for example, restraining the engine speed, which increases as the target engine speed is restored, from overshooting the target engine speed.

After that, a threshold engine speed restoration process (S109) for restoring the threshold engine speed for engine speed reduction prevention control to a pre-reduction value thereof based on the restoration of the target engine speed to the pre-reduction value thereof is executed. In the example of FIG. 2D, the threshold engine speed is restored to the pre-reduction value thereof after time T3, more specifically, at time T4 when the target engine speed is equal to the pre-reduction value thereof.

According to the first embodiment of the invention described above, the following effect is obtained. (1) When the engine 1 shifts to idle operation in the process of stopping the automobile from running, the target engine speed for the engine idle speed control is reduced and the threshold engine speed for the engine speed reduction prevention control is also reduced accordingly, provided that the automobile is traveling on a road surface with a low friction coefficient. Thus, the engine speed is restrained from being reduced through the action of a disturbance on the driving wheels 6 and becoming equal to or lower than the threshold engine speed when reduction of the engine speed occurs as the target engine speed is reduced. Accordingly, if the target engine speed is reduced as described above in the process of stopping the automobile from running, the engine speed reduction prevention control is restrained from being execution as a result of reduction of the target engine speed, and the automobile may be swiftly stopped even if there is a rapid rise in the engine speed as a result of the execution of the engine speed reduction prevention control. Further, the engine 1 does not stall either as a result of the restraint of the execution of the engine speed reduction prevention control.

(2) There may arise a situation where the engine speed is reduced as a result of an increase in the rotational resistance of the engine 1 caused by the driving of the auxiliaries such as a compressor for an air-conditioner and the like, unless the target engine speed for the engine idle speed control and the threshold engine speed for the engine speed reduction prevention control are restored to the pre-reduction values thereof respectively after the automobile has been stopped from running. In addition, even if the engine speed reduction prevention control is executed when the engine speed is equal to or below the threshold engine speed through reduction of the engine speed, there may also arise a situation where the engine speed cannot be rapidly raised. However, the target engine speed is restored to the pre-reduction value thereof through the target engine speed restoration process, and moreover, the threshold engine speed is also restored to the pre-reduction value thereof through the threshold engine speed restoration process, provided that the automobile has been stopped from running. Therefore, the occurrence of the inconvenience may be suppressed.

Next, the second embodiment of the invention will be described with reference to FIGS. 4A to 4E and FIGS. 5A to 5E. In the second embodiment of the invention, modifications are added to the modes of performance of the threshold engine speed reduction process (S105 in FIG. 3) and the threshold engine speed restoration process (S109 in FIG. 3) to suppress the stalling of the engine 1 in reducing/restoring the threshold engine speed for the engine speed reduction prevention control.

Figures 4A, 4B, 4C, 4D, 4E:
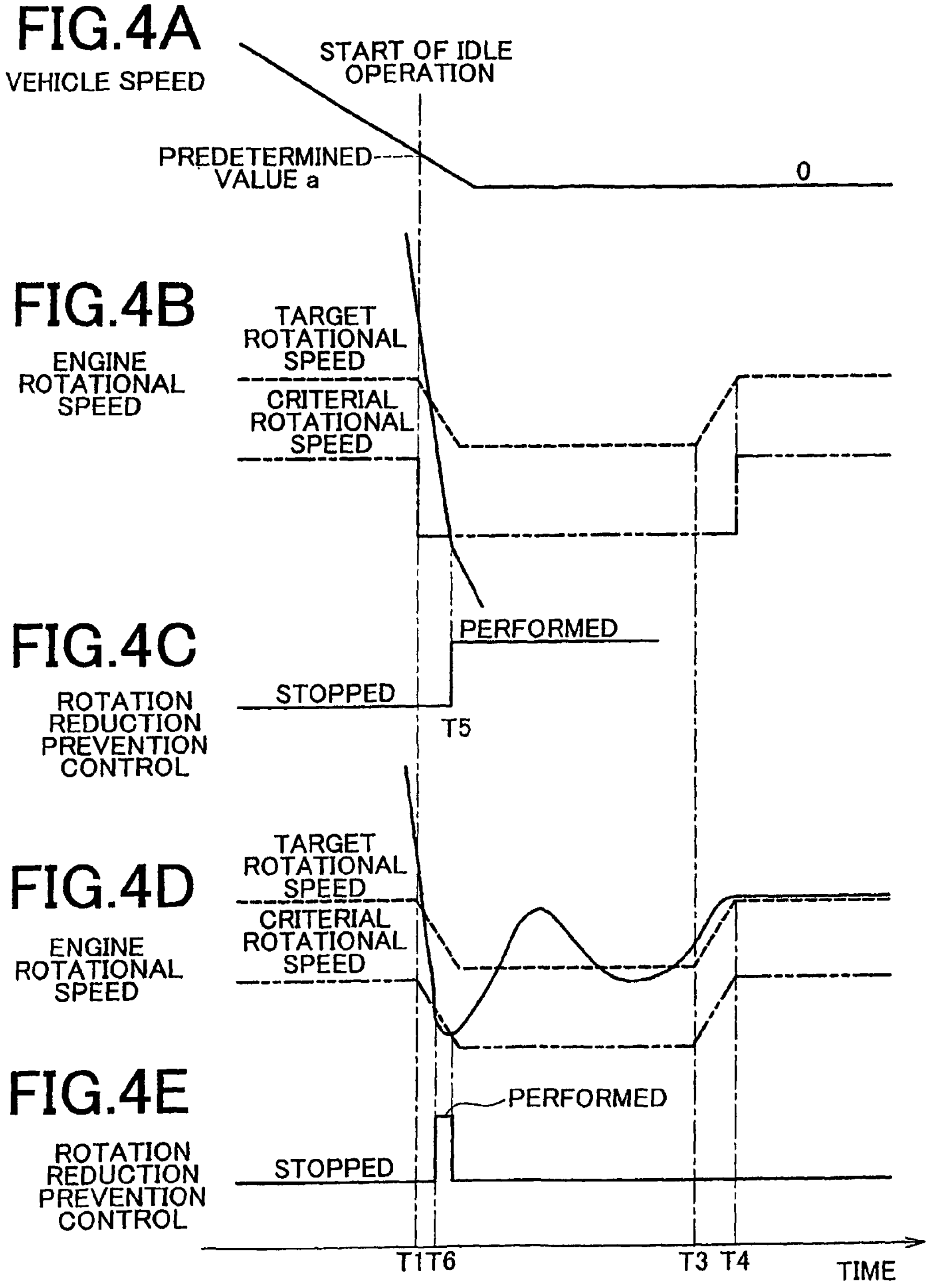
FIGS. 4A to 4E are time charts respectively showing changes in vehicle speed, changes in engine rotational speed, and a mode of performance of rotation reduction prevention control in a process of stopping an automobile from running in the second embodiment of the invention.
Figure 5A:
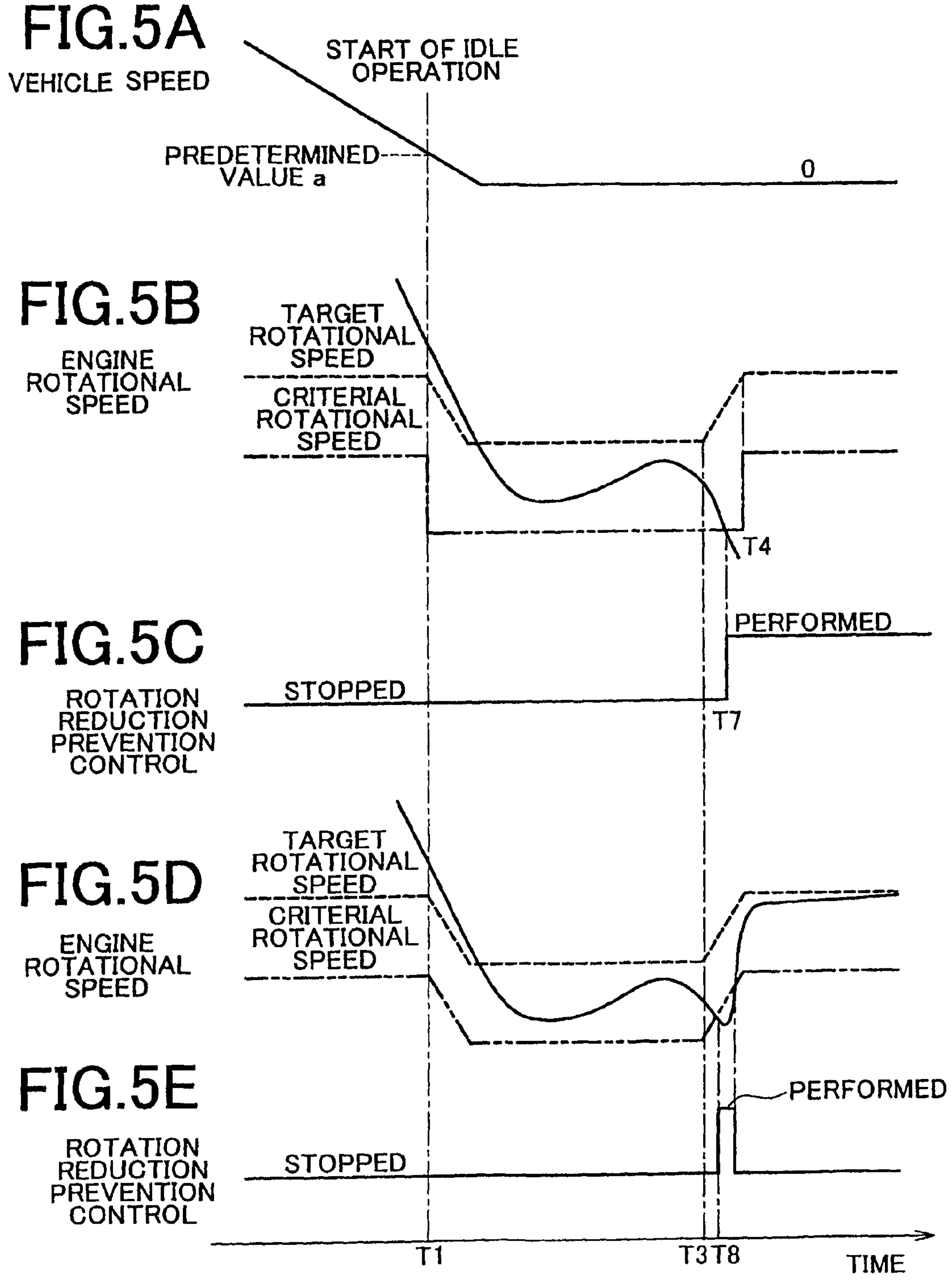

In the first embodiment of the invention when the target engine speed for the engine idle speed control is gradually reduced upon a shift of the engine 1 to idle operation in the process of stopping the automobile from running (T1 in FIG. 4A), the threshold engine speed for the engine speed reduction prevention control is rapidly reduced at time (T1), which corresponds to the start of reduction of the target engine speed as shown in FIG. 4B. In that case, the threshold engine speed is made much lower than the target engine speed (broken lines), which is gradually reduced. Under this situation, if the engine speed is rapidly reduced as indicated by a solid line in FIG. 4B, there may occur an inconvenience as to a rapid increase in the engine speed through the execution of the engine speed reduction prevention control. That is, if the engine speed is equal to or below the threshold engine speed (alternate long and two short dashes lines), which has been made much lower than the target rotational speed (as indicated by the broken lines), due to rapid reduction of the engine speed (at time T5), the engine speed cannot be rapidly increased despite the execution of the engine speed reduction prevention control as shown in FIG. 4C, and the engine 1 may stall.

In the second embodiment of the invention, in order to reduce the possibility that the engine 1 will stall, the threshold engine speed is gradually reduced in a manner corresponding to reduction of the target engine speed (as indicated by broken lines in FIG. 4D) as the threshold engine speed reduction process, as indicated by alternate long and two short dashes lines in FIG. 4D. More specifically, the threshold engine speed is set as a value obtained by subtracting a certain set value from the target engine speed, which is gradually reduced as described above. The threshold engine speed is thereby gradually reduced in a manner corresponding to reduction of the target engine speed. It is conceivable to use as the set value, for example, a difference between the target engine speed and the threshold engine speed upon the shift (T1) of the engine 1 to idle operation.

Due to the foregoing procedure, when the engine speed is rapidly reduced, as indicated by a solid line in FIG. 4D, in a situation where the target engine speed is being gradually reduced (as indicated by the broken lines), reduction of the engine speed to a value equal to or lower than the threshold engine speed (as indicated by the alternate long and two short dashes lines), which is gradually reduced as the target engine speed is reduced, occurs at an early timing (at a timing T6). As a result, as shown in FIG. 4E, the engine speed reduction prevention control is swiftly executed to rapidly increase the engine speed. The engine speed is thus rapidly increased through the engine speed reduction prevention control at an early timing when the engine speed is being rapidly reduced. Therefore, the occurrence of the inconvenience, namely, the possible stalling of the engine 1, due to the inability to rapidly increase the engine speed is suppressed.

On the other hand, if the target engine speed of engine idle speed control is gradually restored to the pre-reduction value thereof after the automobile has been stopped from running, the threshold engine speed of the engine speed reduction prevention control is rapidly restored upon the completion (T4) of restoration of the target engine speed as shown in FIG. 5B, in the first embodiment of the invention. It should be noted herein that the threshold engine speed is made much lower than the target engine speed between a time point (T3) corresponding to the start of restoration of the target rotational speed and a time point (T4) corresponding to restoration of the threshold engine speed. Under this situation, if the engine speed is rapidly reduced due to an increase in the driving load of any one of the auxiliaries, such as a compressor for an air-conditioner driven by the engine 1 or the like, as a result of an increase in the drive request value for the auxiliary, there may occur an inconvenience as to a rapid increase in the engine speed through engine speed reduction prevention control. That is, if the engine rotational speed is equal to or below the threshold engine speed, which has been made much lower than the target engine speed, due to rapid reduction of the engine speed (at a timing T7), the engine speed cannot be rapidly increased despite the execution of the engine speed reduction prevention control as shown in FIG. 5C, and the engine 1 may stall.

In this second embodiment of the invention, to suppressing the stalling of the engine 1 as described above, the threshold engine speed is gradually restored to the pre-reduction value thereof in a manner similar to restoration of the target engine speed to the pre-reduction value thereof (as indicated by broken lines in FIG. 5D) as the threshold engine speed restoration process, as indicated by alternate long and two short dashes lines in FIG. 5D. More specifically, the threshold engine speed is obtained by subtracting a predetermined value from the target engine speed, which is gradually restored to the pre-reduced value thereof as described above. The threshold engine speed is thereby gradually restored to the pre-reduction value thereof in a manner similar to restoration of the target engine speed to the pre-reduction value thereof. It is conceivable to use as the predetermined value, for example, the difference between the target engine speed and the threshold engine speed upon the start of restoration (T3) of the target engine speed to the pre-reduction value thereof.

Owing to the foregoing procedure, if the engine speed (as indicated by the solid line) is rapidly reduced due to an increase in the drive load (rotational resistance) of any one of the auxiliaries in the engine 1 or the like under a situation where the target engine speed is being gradually restored to the pre-reduction value thereof, reduction of the engine speed to a value equal to or below the threshold engine speed (as indicated by the alternate long and two short dashes lines), which is being gradually restored to the pre-reduction value thereof, occurs at an early timing (at a timing T8). As a result, as shown in FIG. 5E, engine speed reduction prevention control is swiftly executed to rapidly increase the engine speed. The engine speed is thus rapidly increased through the engine speed reduction prevention control at an early timing if the engine speed is rapidly reduced. Therefore, the occurrence of the inconvenience, namely, the possible stalling of the engine 1 resulting from the inability to rapidly increase the engine speed is suppressed.

According to the second embodiment of the invention described above in detail, the following effects are obtained in addition to the effects (1) and (2) of the first embodiment of the invention. (3) The threshold engine speed is gradually reduced in a manner corresponding to reduction of the target engine speed through the target engine speed reduction processing, as the threshold engine speed reduction process. Thus, if the engine speed is rapidly reduced under a situation where the target engine speed is being gradually reduced, reduction of the engine speed to a value equal to or below the threshold engine speed, which is gradually reduced as the target engine speed is reduced, occurs at an early timing. As a result, engine speed reduction prevention control is swiftly executed to rapidly increase the engine speed. Therefore, the engine 1 may be restrained from stalling due to the inability to rapidly increase in the engine speed.

(4) The threshold engine speed is gradually reduced threshold value by subtracting a certain set value from the target engine speed. Thus, the threshold engine speed can be appropriately and gradually reduced in accordance with gradual reduction of the target engine speed.

(5) As the threshold engine speed restoration process, the threshold engine speed is gradually restored to the pre-reduction value thereof in a manner corresponding to restoration of the target engine speed to the pre-reduction value thereof through the target engine speed restoration process. Thus, when the engine speed is rapidly reduced due to an increase in the drive load (rotational resistance) of any one of the auxiliaries in the engine 1 or the like under a situation where the target engine speed is being gradually restored to the pre-reduction value thereof, reduction of the engine speed to a value equal to or lower than the threshold engine speed, which is being gradually restored to the pre-reduction value thereof, occurs at an early timing. As a result, rotation reduction prevention control is swiftly performed to rapidly increase the engine speed. Therefore, stalling of the engine 1 due to the inability to sufficiently increase the engine speed is prevented.

(6) The threshold engine speed is gradually restored to the pre-reduction value thereof by setting, as the threshold engine speed, a value obtained by subtracting a certain set value from the target engine speed that is gradually restored to the pre-reduction value thereof. Thus, the threshold engine speed may be appropriately and gradually restored to the pre-reduction value thereof in accordance with gradual restoration of the target engine speed to the pre-reduction value thereof.

Next, the third embodiment of the invention will be described on the basis of FIG. 6. The third embodiment of the invention is suppresses the occurrence of a situation where a rapid increase in the engine speed through the engine speed reduction prevention control cannot be realized and the engine 1 may stall even if the engine speed is equal to or below the threshold engine speed and engine speed reduction prevention control is executed when the threshold engine speed for the engine speed reduction prevention control has been reduced in the second embodiment of the invention.

If the threshold engine speed has been reduced through the threshold engine speed reduction process as indicated by alternate long and two short dashes lines in FIG. 6B, it is possible for the threshold engine speed to fall below a lower-limit engine speed (as indicated by alternate long and short dash lines in FIG. 6B), which is the minimum engine speed at which the engine 1 may autonomously operate. In this case, even if the engine speed is reduced as indicated by a solid line in FIG. 6B to become equal to or lower than the threshold engine speed and the engine speed reduction prevention control is executed as shown in FIG. 6C (at a timing T9), the engine 1 may stall due to the inability to rapidly increase the engine speed through engine speed reduction prevention control.

In the third embodiment of the invention, with a view to suppressing the occurrence of a stall of the engine 1 as described above, when the threshold engine speed is reduced through the threshold engine speed reduction process, the reduced threshold engine speed is compared with the lower-limit engine speed. If the threshold engine speed is lower than the lower-limit engine speed, the lower-limit engine speed is used as the threshold engine speed. In other words, the lower-limit rotational speed serves as a lower-limit guard value of the threshold engine speed. In this case, accordingly, the threshold engine speed is set equal to the lower-limit engine speed (as indicated by the alternate long and short dash lines) as indicated by the alternate long and two short dashes lines in FIG. 6D. The lower-limit engine speed used herein is calculated based on the temperature of the engine coolant (corresponding to the engine temperature) with reference to a map or the like, which has been determined in advance through an experiment or the like. Then, the lower-limit engine speed is so variably set, on the basis of the temperature of the coolant for the engine 1, as to increase as the temperature of the coolant decreases. This is because, as the temperature of the engine coolant decreases, the temperature of the lubricant for the engine 1 decreases, which causes the viscosity of the lubricant to increase, and thus the rotational resistance of the engine 1 is increased.

Figures 6A, 6B, 6C, 6D, 6E:
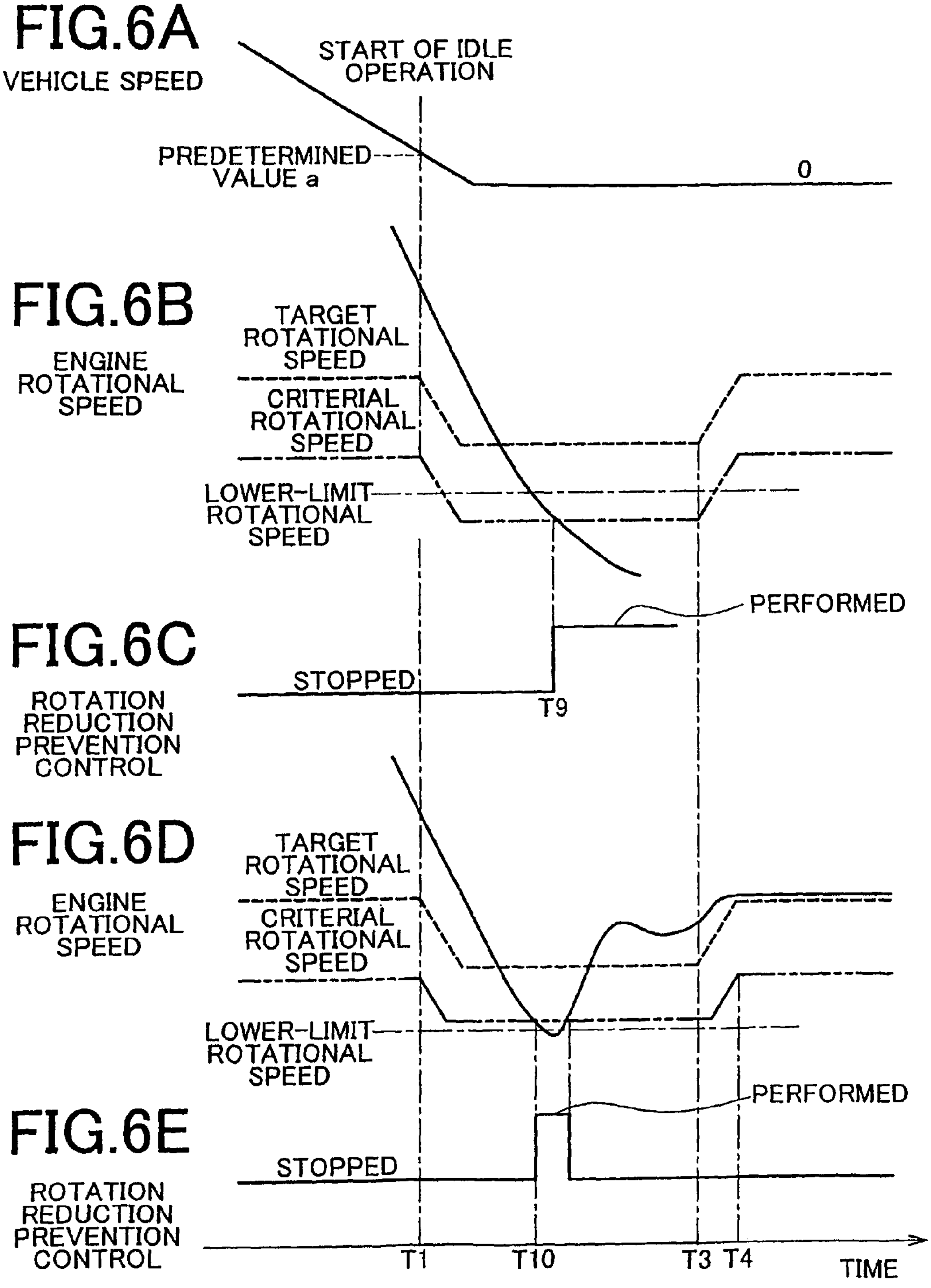
FIGS. 6A to 6E are time charts respectively showing changes in vehicle speed, changes in engine rotational speed, and a mode of performance of rotation reduction prevention control in a process of stopping an automobile from running in the third embodiment of the invention.

In the case where the threshold engine speed is set equal to the lower-limit engine speed through the guard, when the engine speed is equal to or below the threshold engine speed (the lower-limit engine speed) as indicated by the solid line in FIG. 6D, the engine speed reduction prevention control is executed as shown in FIG. 6E based on the reduction in the engine speed (at a timing T10). The engine speed reduction prevention control is executed when the engine speed is equal to or below the lower-limit engine speed. Therefore, the occurrence of the inconvenience, namely, the stalling of the engine 1 resulting from the inability to rapidly increase the engine speed despite the performance of the control is suppressed.

According to the third embodiment of the invention, the following effect is obtained in addition to the effect of the second embodiment of the invention. (7) Even when the threshold engine speed for the engine speed reduction prevention control is reduced through the threshold engine speed reduction process, the threshold engine speed is reduced, at most, to the lower-limit engine speed, which is the minimum engine speed at which the engine 1 may autonomously operate. Thus, when the engine speed is reduced to a value equal to or below the threshold engine speed and the engine speed reduction prevention control is executed, the occurrence of the inconvenience, namely, the stalling of the engine 1 resulting from the inability to rapidly increase the engine speed through the control may be appropriately suppressed.

The foregoing respective embodiments of the invention may also be modified, for example, as follows. The lower limit guard for the threshold engine speed in the third embodiment of the invention may be applied to the first embodiment of the invention.

In the second embodiment of the invention, the threshold engine speed can also be gradually reduced in the threshold engine speed reduction process based on the lapse of time from a time point corresponding to the start of reduction of the target engine speed through the target engine speed reduction process.

In the second embodiment of the invention, the threshold engine speed can also be gradually restored to the pre-reduction value thereof in the threshold engine speed restoration process based on the lapse of time from a time point corresponding to the start of restoration of the target engine speed through the target engine speed restoration process.

In the target engine speed reduction process according to the first embodiment of the invention, the target engine speed may be reduced at once. In the target engine speed reduction process according to each of the foregoing embodiments of the invention, the threshold value for determining whether the target engine speed is high may be set such that the driving force that is applied to the driving wheels 6 based on the engine speed if the engine speed is adjusted to that value is smaller than a maximum value of the braking force applied to the driving wheels 6 by the brake 23.

In the target engine speed reduction process according to each of the described embodiments of the invention, when the engine 1 shifts to idle operation in the process of stopping the automobile from running, the target engine speed may always be reduced if the automobile is traveling on a road surface with a low friction coefficient, regardless of whether the target engine speed is equal to or higher than the threshold value.

In the target engine speed reduction process according to each of the foregoing embodiments of the invention, the amount by which the target engine speed is reduced does not need to be variably set based on the pre-reduction target engine speed and the threshold value. For example, a fixed value that has been empirically determined may also be used as the reduction amount.

The invention may also be applied to a front-wheel-drive automobile. A more desirable effect is achieved if the invention is applied to a rear-wheel-drive automobile as in each of the foregoing embodiments of the invention. This is related to the fact that the braking force exerted by a brake acting on rear wheels is smaller than the braking force exerted by a brake acting on front wheels in an automobile from the standpoint of posture stability in the process of stopping the automobile from running. That is, in the rear-wheel-drive automobile, the braking force exerted by the brake acting on the rear wheels is small, and the driving force applied to the driving wheels as a result of idle operation of the engine 1 in the process of stopping the automobile from running tends to be larger than the braking force exerted by the brake acting on the driving wheels. Therefore, it tends to take some time to stop the automobile from running. By applying the invention to the rear-wheel-drive automobile, which has this characteristic, a more desirable effect is achieved.

The invention may be applied to an automobile equipped with a negative pressure brake booster that assists the depression of a brake using negative pressure generated in the intake system of the engine 1. In this case, a more desirable effect is achieved. When the engine 1 is idling, the negative pressure generated in the intake system of the engine 1 tends to become equal to a value on the atmospheric pressure side. In this state, the brake booster does not provide much assistance in the depression of the brake, and the braking force applied to the driving wheels decreases. That is, in an automobile equipped with a negative pressure brake booster, when the engine 1 shifts to idle operation in the process of stopping the automobile from running, the braking force exerted by the brakes acting on the driving wheels tends to decrease, and the driving force applied to the driving wheels as a result of the idle operation tends to exceed the braking force. Therefore, it tends to take some time to stop the automobile from running. By applying the invention to the automobile equipped with the negative pressure brake booster, which has this characteristic, a more desirable effect is achieved.

The engine 1 may execute the idle speed control by adjusting the opening degree of an idle speed control valve provided in a bypass passage that bypasses the throttle valve 12.

The engine 1 may be a diesel engine whose rotational speed during idle operation is controlled through the adjustment of the amount of fuel injection.

The invention claimed is:

1. A control method for an internal combustion engine mounted on a vehicle, wherein an engine idle speed control for adjusting an engine speed to a target engine speed set in accordance with an engine operation state and an engine speed reduction prevention control for rapidly increasing the engine speed to suppress stalling of the internal combustion engine when the engine speed becomes equal to or lower than a threshold engine speed, which is lower than the target engine speed, are executed when the engine is idling and the target engine speed of the engine idle speed control is reduced when a speed of the vehicle is equal to or below a predetermined vehicle speed to shift the internal combustion engine to idle operation when stopping the vehicle from traveling, the control method comprising:

determining whether the vehicle is stopping from traveling and the engine is shifting to idle operation;

detecting whether the vehicle is traveling on a road surface with a low friction coefficient as compared to that of a standard road surface; and reducing the target engine speed and reducing the threshold engine speed of the engine speed reduction prevention control if the vehicle is traveling on a road surface with a low friction coefficient.

2. The control method according to claim 1, further comprising an electronic control unit configured with executable program logic for performing the steps of detecting whether the vehicle is stopping from traveling, detecting whether the vehicle is traveling on a road surface with a low friction coefficient as compared to that of a standard road surface, reducing the target engine speed, and reducing the threshold engine speed of the engine speed reduction prevention control if the vehicle is traveling on a road surface with a low friction coefficient.

3. A control apparatus for an internal combustion engine mounted on a vehicle, wherein an engine idle speed control for adjusting an engine speed to a target engine speed set in accordance with an engine operation state and an engine speed reduction prevention control for rapidly increasing the engine speed to suppress stalling of the internal combustion engine when the engine speed becomes equal to or lower than a threshold engine speed, which is lower than the target engine speed, are executed when the engine is idling and the target engine speed of the engine idle speed control is reduced when a speed of the vehicle is equal to or below a predetermined vehicle speed to shift the internal combustion engine to idle operation when stopping the vehicle from traveling, the control apparatus comprising:

an electronic control unit, configured with executable program logic, to perform;

detecting that the vehicle is stopping from traveling and the internal combustion engine is shifting to idle operation;

detecting whether the vehicle is traveling on a road surface with a low friction coefficient as compared to that of a standard road surface; and reducing the target engine speed and reducing the threshold engine speed of the engine speed reduction prevention control if the vehicle is traveling on a road surface with a low friction coefficient.

4. The control apparatus according to claim 3, wherein the target engine speed is gradually reduced when the speed of the vehicle is equal to or below the predetermined vehicle speed in the process of stopping the vehicle from traveling, and the engine speed reduction unit gradually reduces the threshold engine speed in a manner corresponding to reduction of the target engine speed.

5. The control apparatus according to claim 4, wherein the engine speed reduction unit subtracts a predetermined value from the target engine speed, and sets the resulting engine speed as the threshold engine speed.

6. The control apparatus according to claim 4 wherein the engine speed reduction unit reduces the threshold engine speed based on lapse of time from a time point corresponding to start of reduction of the target engine speed.

7. The control apparatus according to claim 3, wherein the target engine speed is restored to a pre-reduction value thereof after having been reduced during idle operation in the process of stopping the vehicle from traveling, provided that the vehicle have been stopped from running, and the engine speed reduction unit restores the reduced threshold engine speed to a pre-reduction value thereof based on restoration of the target engine speed to the pre-reduction value thereof.

8. The control apparatus according to claim 7, wherein the target engine speed is gradually restored to the pre-reduction value thereof, and the engine speed reduction unit gradually restores the threshold engine speed to the pre-reduction value thereof in a manner corresponding to restoration of the target engine speed to the pre-reduction value thereof.

9. The control apparatus according to claim 8, wherein the engine speed reduction unit restores the threshold engine speed to the pre-reduction value thereof based on lapse of time from a time point corresponding to start of restoration of the target engine speed to the pre-reduction value thereof.

10. The control apparatus according to claim 3, wherein the reduced threshold engine speed and a lower-limit engine speed as a value corresponding to a minimum engine speed at which the internal combustion engine can be autonomously operated are compared with each other, and the lower-limit engine speed is set as the threshold engine speed when the threshold engine speed is lower than the lower-limit engine speed.

11. The control apparatus according to claim 10, wherein the engine speed reduction unit sets the lower-limit engine speed in accordance with an engine temperature.

* * * * *